H. ALLEN.
SEWER-CLEANER.
No. 187,795. Patented Feb. 27, 1877.
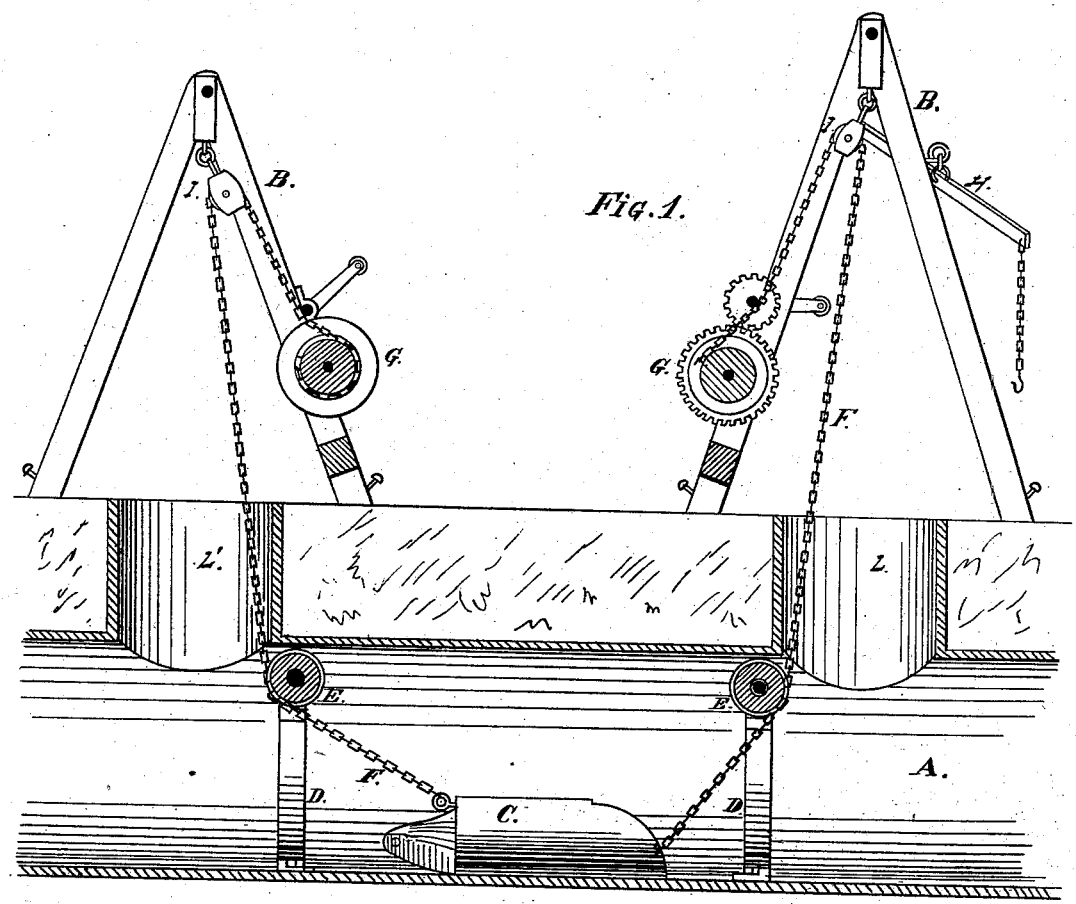
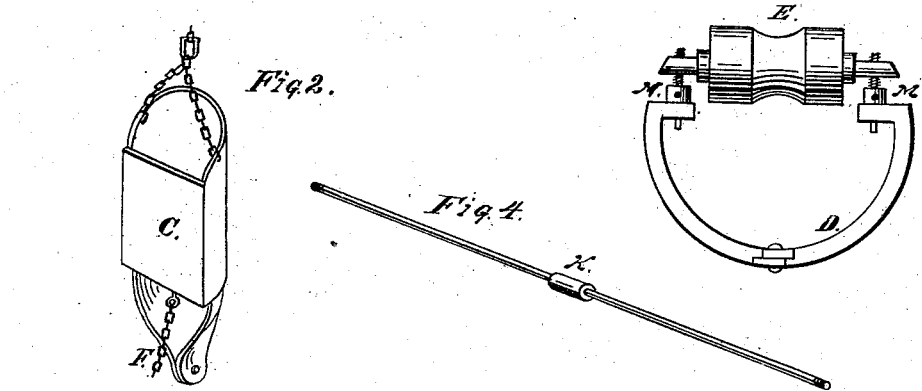
WITNESSES:
INVENTOR:
Henry Allen

UNITED STATES PATENT OFFICE.

HENRY ALLEN, OF MILWAUKEE, WISCONSIN.

IMPROVEMENT IN SEWER-CLEANERS.

Specification forming part of Letters Patent No. 187,795, dated February 27, 1877; application filed December 14, 1876.

*To all whom it may concern:*

Be it known that I, HENRY ALLEN, of Milwaukee, in the county of Milwaukee, in the State of Wisconsin, have invented certain Improvements in Sewer Cleaners, of which the following is a specification:

My invention has for its object the cleaning of sewers, and is constructed so that a large part of the expense of sewer-cleaning is saved; for with my invention four men will clean as much as sixteen men will clean without it. It is constructed with derricks and windlasses erected over the openings in the sewer, and a scoop and plow are attached to a chain which passes around the windlasses, and with the windlasses is hauled back and forth. When hauled back the plow-end of the scoop loosens the débris, and when hauled forward the scoop takes up the mud and filth in the sewer, and it is hauled up through the opening and emptied into a cart to be hauled away. In the sewer is a yoke secured with set-screws, with a roller at the top of same, under which the chain runs, and is kept from abrading the sewer. The chain which is attached to the plow is passed at the commencement from one opening to the other in the sewer by rods made in short pieces and fastened together with screws at their ends, so that they will reach from one opening in the sewer to the other, and the chain when thus passed through the sewer in that manner is connected, one end to the plow end of the scoop, and the other end of the chain to the scoop end of the same, and the derricks at each opening sustain a windlass and crank for hauling the scoop and plow back and forth.

Figure 1 is a sectional view of my invention. Fig. 2 is a view of the scoop and plow. Fig. 3 is a view of a yoke, and Fig. 4 a view of the rod with which the rope is pushed through to hitch on to the chain.

A is the sewer; B B, derricks; C, scoop and plow; D, a yoke; E E, rollers in the yoke; F F, chains with which the scoop and plow are operated; G G, windlasses; H, a dumping-lever to dump the scoop when it is hauled out of the sewer; I I, blocks hitched to the top of derricks, through which the chains F run; K, a rod with joints in it, with which a rope is pushed through the sewer, to be hitched to the end of one of the chains, so that the chains may be pulled through the sewer; L L, openings from the street to the sewer; M M, jack-screws in the yoke.

Operation: The derricks are erected over the openings in the street to the sewer; the yokes are put in their places in the sewer; the jack-screws set up so as to hold them securely in place; the scoop is hitched to the chain at its forward end, and two men step down into the sewer, one at each opening; the man in the opening L takes a piece of the rod K and runs it into the sewer its length, and then takes another piece of the rod and screws it into the splice on the end of the first piece and shoves it along adding piece to piece till the end of the rod reaches the man at the other opening, and then attaches a rope to the end of the rod while the man at the other end pulls the rod along till he reaches the rope, and then with the rope pulls the chain through and attaches it to the plow end of the scoop, the other end of the rope being attached to the chain for that purpose, and then running the rod along, so as to leave it in the sewer and left ready to be used in the next length of sewer; then the men come out of the sewer, the plow and scoop are drawn back, and the débris loosened far enough, so that when the scoop is drawn forward it will be filled and drawn out and dumped and then hauled back again, and this process is gone through with till the sewer is cleaned, and then the derricks are removed to the next openings, and the same operation is gone through with again.

What I claim as my invention is—

1. A scoop, with a plow at one end of same, yokes D D and rollers E E, in combination with derricks B B and chains F F, substantially as described.

2. Yoke D, roller E, and screws M, placed in a sewer, substantially as and for the purpose described.

HENRY ALLEN.

Witnesses:
J. B. SMITH,
A. H. SCHATTENBERG.